United States Patent [19]

Nishishita et al.

[11] Patent Number: 5,370,176
[45] Date of Patent: Dec. 6, 1994

[54] HEAT EXCHANGER APPARATUS

[75] Inventors: Kunihiko Nishishita; Takashi Kinugasa; Takashi Sugita, all of Konan, Japan

[73] Assignee: Zexel Corporation, Tokyo, Japan

[21] Appl. No.: 174,806

[22] Filed: Dec. 29, 1993

[30] Foreign Application Priority Data

Feb. 10, 1993 [JP] Japan ................. 5-045733
Feb. 10, 1993 [JP] Japan ................. 5-045734

[51] Int. Cl.$^5$ ............................... F28F 9/00
[52] U.S. Cl. ........................ 165/81; 165/153; 165/173; 165/76
[58] Field of Search ............ 165/81, 82, 153, 173, 165/176, 178, 76; 62/515

[56] References Cited

U.S. PATENT DOCUMENTS

| 4,479,668 | 10/1984 | Jacquet | 285/137 R |
| 4,487,038 | 12/1984 | Iijima | 62/515 |
| 4,821,531 | 4/1989 | Yamauchi et al. | 62/515 |
| 5,209,290 | 5/1993 | Chigira | 165/149 |

FOREIGN PATENT DOCUMENTS

| 1-181090 | 7/1989 | Japan | 165/153 |
| 921446 | 3/1963 | United Kingdom | 165/153 |

*Primary Examiner*—Allen J. Flanigan
*Attorney, Agent, or Firm*—Wenderoth, Lind & Ponack

[57] ABSTRACT

The present invention attempts to offer a heat exchanger apparatus capable of absorbing its compression during its soldering and of allowing an easy connection of its intake/outlet pipes to an expansion valve, wherein the expansion valve is mounted, via a joint member, on refrigerant intake/outlet pipes integrally installed on the core of the heat exchanger apparatus, and wherein said joint member has a securing means for securing one of said intake/outlet pipes, and a compression-absorbing means for the other one of said intake/outlet pipes to slide in the stacking direction of said heat exchanger apparatus. Then, said one of the intake/outlet pipes is secured when the heat exchanger apparatus is soldered in a furnace, while the other one of the intake/outlet pipes can slide toward the joint member according to the compression of the heat exchanger apparatus; thereby, the compression during the soldering of the heat exchange apparatus can be absorbed; the positions of the pipes are determined; the distance between both pipes, which have been secured under these conditions, can be determined.

9 Claims, 10 Drawing Sheets

HEAT EXCHANGER APPARATUS

BACKGROUND OF THE INVENTION

1. Field of the Invention

The present invention pertains to an heat exchanger apparatus used primarily for an automobile air conditioner.

2. Description of the Related References

With this type of heat exchanger apparatus, generally, an entire core of a heat exchanger apparatus is integrally put together first by soldering; subsequently, intake/outlet pipes for refrigerant are connected to it by welding; and an expansion valve is connected to these welded intake/outlet pipes.

However, manufacturing of a heat exchanger apparatus having the welded intake/outlet pipes requires excessive processes, which is a problem.

Accordingly, in conventional heat exchanger apparatuses, e.g. those disclosed in Japanese Patent Unexamined Publication 63-267868, Japanese Utility Model Unexamined Publication 64-28762, and in Japanese Patent Unexamined Publication 02-50059, the intake/outlet pipes for a refrigerant are preliminarily integrated into the core of a heat exchanger apparatus, and the expansion valve is mounted on them by means of a block type joint member.

However, with this type of heat exchanger apparatus, wherein the intake/outlet pipes are integrally formed on the core, as in the aforementioned examples, the heat exchanger apparatus is compressed inward in the stacking direction of tube elements when the soldering is completed, and thereby the distance between the intake/outlet pipes is changed according to the compression levels of the heat exchanger apparatus.

As with the cases of the aforementioned examples, when the heat exchanger apparatus has as few as two refrigerant passages a reduction in the distance between the two intake/outlet pipes will be manageable if the two intake/outlet pipes are installed near the center of the heat exchange apparatus. However, if a heat exchanger apparatus has as many as four or six refrigerant passages, the distance between the intake/outlet pipes will be longer since the intake/outlet pipes are positioned near the edges of the heat exchanger apparatus, respectively, which results in the greater reduction in the distance between the two pipes, causing a problem that determining the distance between the intake/outlet pipes is difficult when they are connected to the expansion valve.

SUMMARY OF THE INVENTION

The present invention attempts to offer a heat exchanger apparatus, which can absorb its compression during soldering, and which is constructed so that its intake/outlet pipes can be easily connected to an expansion valve.

To achieve these objectives, the present invention offers a heat exchanger apparatus comprising a core having a multi-layer structure of tube elements with fin members between each of tube elements, and a joint member for attaching an expansion valve to the intake/outlet pipes integrally formed on the core, wherein the aforementioned joint member is equipped with a first securing means to secure one of the aforementioned intake/outlet pipes and with a second securing means to secure the other one of the intake/outlet pipes and to simultaneously absorb the displacement of the aforementioned tube elements taking place in the stacking direction.

Therefore, when the heat exchanger apparatus is being soldered in a furnace, one of the aforementioned intake/outlet pipes is secured, whereas the other one of intake/outlet pipes can slide toward the joint member according to the compression of the heat exchanger apparatus, so the compression of the heat exchanger apparatus during soldering needs to be taken into consideration when the pipes are positioned before they are secured; by so doing, the distance between both pipes is finally determined, and the aforementioned problems can be solved.

DETAILED DESCRIPTION OF THE PREFERRED EMBODIMENT

Figure 1:
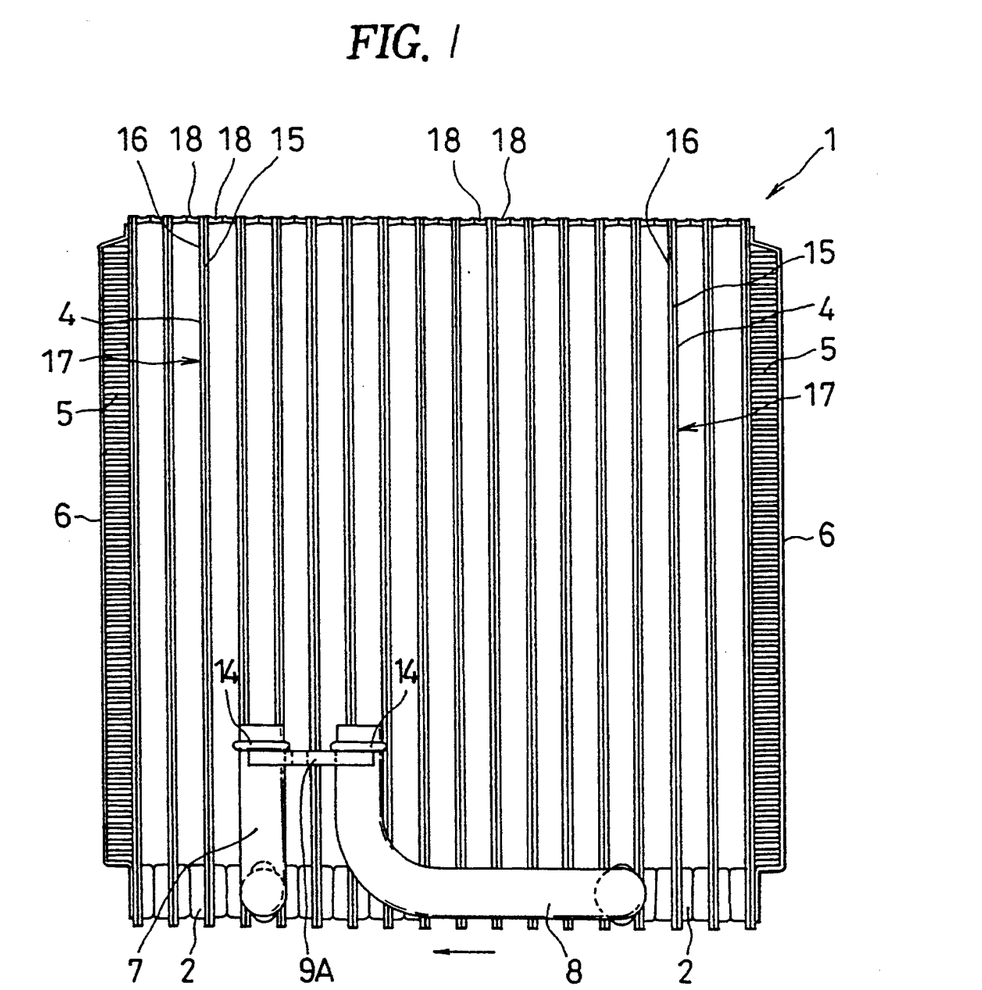
FIG. 1 shows a front view of the heat exchanger apparatus equipped with the joint member, referred to in a first example of the preferred embodiment of the present invention.
Figure 2:
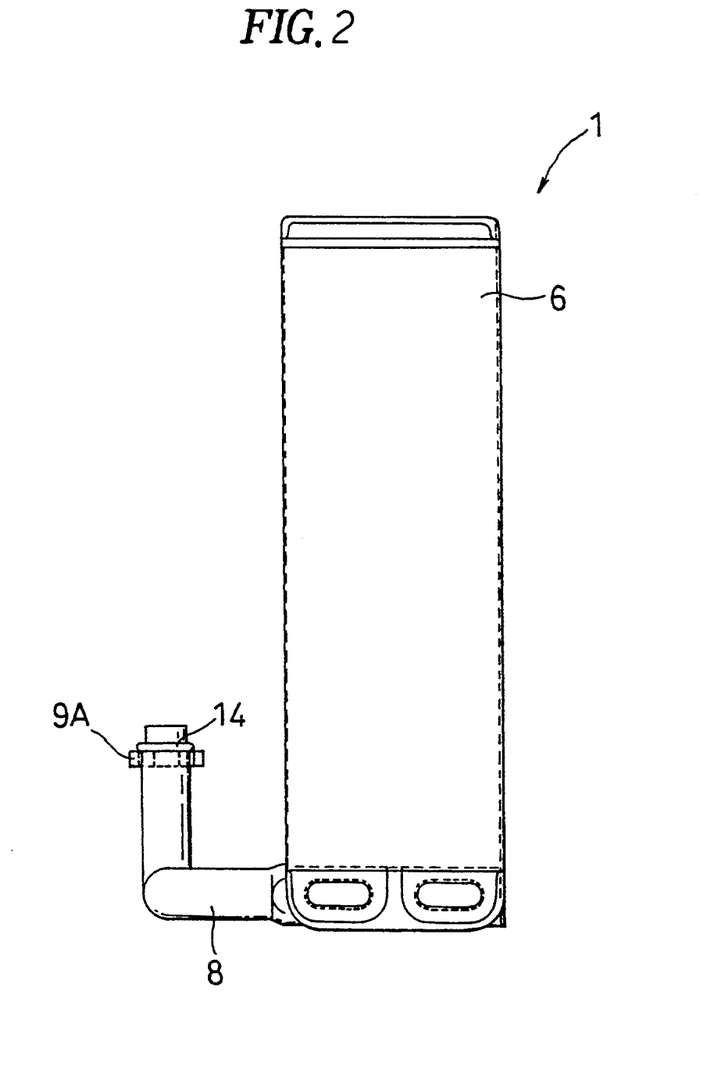
FIG. 2 shows a side view of the heat exchanger apparatus.
Figure 3:
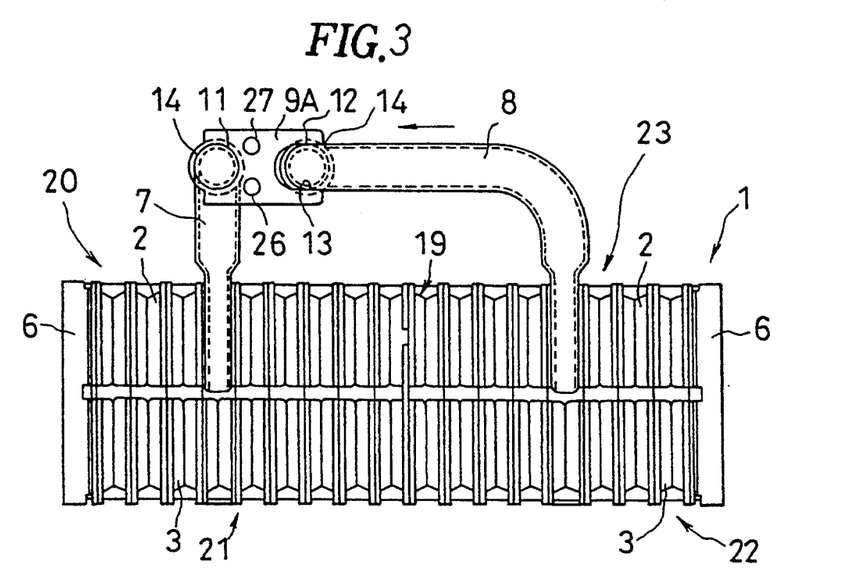
FIG. 3 shows a bottom view of the heat exchanger apparatus.
Figure 8:
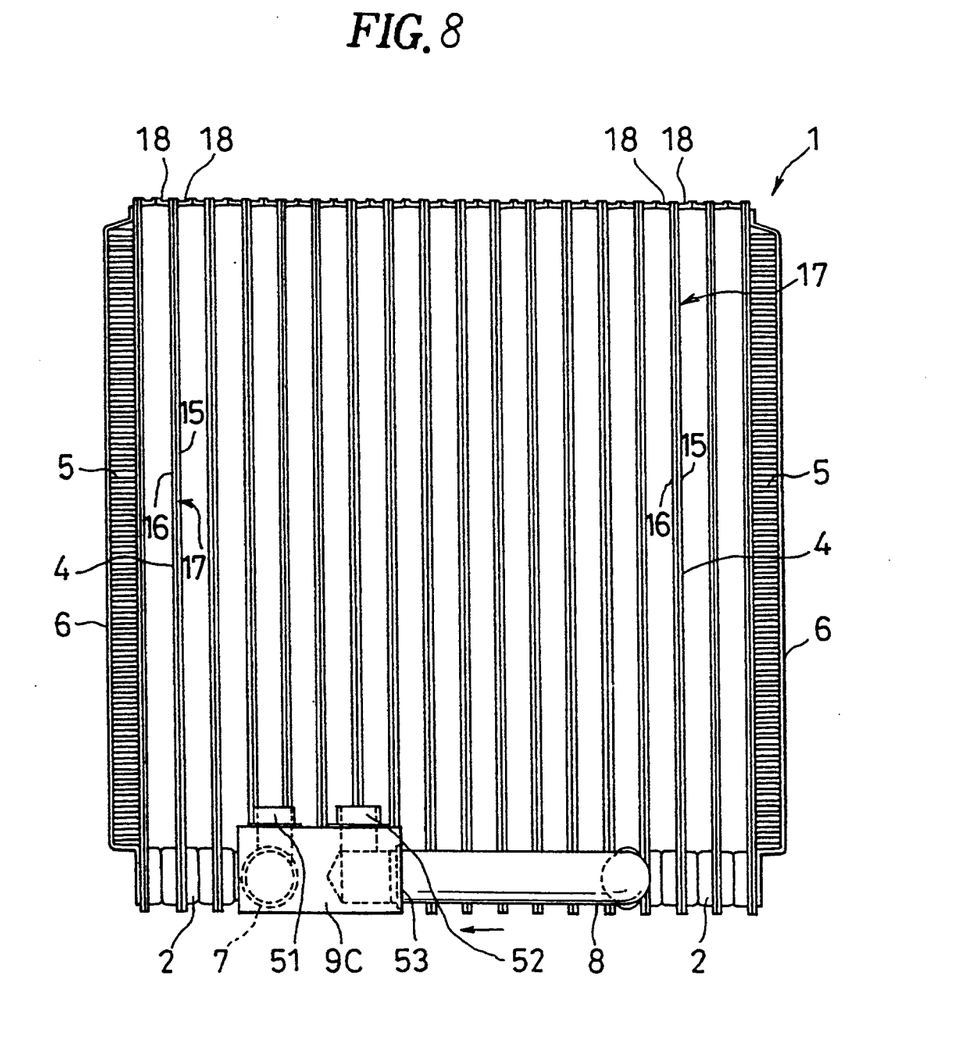
FIG. 8 shows a front view of the heat exchanger equipped with the joint member, referred to in a third example of the preferred embodiment of the present invention.
Figure 9:
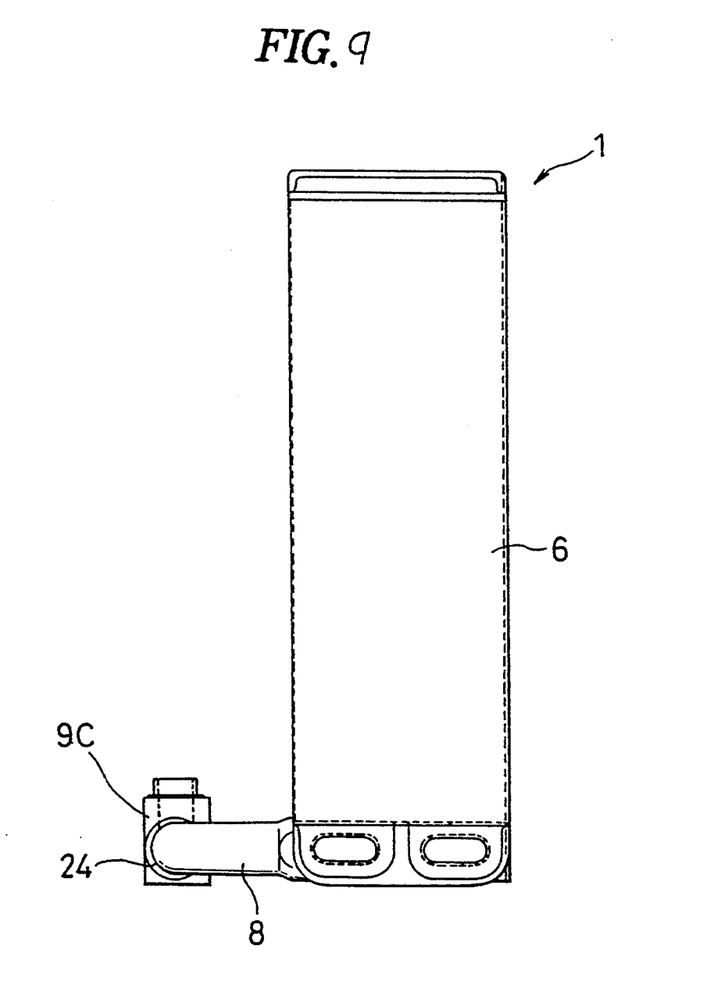
FIG. 9 shows a side view of the heat exchanger apparatus

In FIG. 1 and FIG. 8 show the heat exchanger apparatus 1 which has the following construction: multiple layers of tube elements 4 with a pair of tanks 2, 3 at the lower side are stacked with a corrugated fin members 5 between each tube element; end plates 6, 6 are installed along both edges of the multi-layer structure in the stacking direction tube elements; at some point along the stacking direction of tube elements 4, refrigerant intake/outlet pipes 7, 8 are installed; and joint member 9 is secured to the tip ends of intake/outlet pipes 7, 8. To this joint member 9 (9A, 9B, 9C, 9D), expansion valve 10 is connected. Tube element 4, nearly rectangular in shape, is composed of two molded plates 15, 16, which are mated together, and has a pair of tanks 2, 3 at its one end. From one ends of tanks 2, 3, over to their other ends, a nearly U-shaped passage 17 is formed. On the other end of tube element 4, tube element-contacting unit 18 is formed in a curve.

Tube element 4 constructed as above is stacked in multiple layers, and at its one end, tanks 2, 3 adjacent to each other, are brought into contact with each other, and at the other end, tube element-contacting units 18 adjacent to each other, are brought into contact with each other. Fin members 5 are inserted between each tube element 5, so as to contact refrigerant passage 17 of each tube element 4 in the stack, and along both edges of the multi-layer structure in the stacking direction, end plates 6, 6 are installed; the core of the heat exchanger apparatus is thus constructed.

Adjacent tanks 2, 3 contacting each other on the core of the heat exchanger apparatus communicate with each other via an opening not indicated in the drawings, and a blind tank 19 without an opening installed near the center in the front divides the communication unit of the front tank into left and right sides. As to the rear tanks, every tank adjacent to each other communicates with each other, and these four tanks 20, 21, 22, and 23 are for supplying, moving, collecting, and discharging the refrigerant, respectively. Intake/outlet pipes 7, 8, which are mentioned below, are integrally installed on tanks 20, 23 for supplying and discharging the refrigerant.

The one ends of intake/outlet pipes 7, 8 inserted in each group of tanks 20, 23 (some point along the contacting point of tanks 2, 3 composed of a group of tanks 20, 23), and the other ends of tanks 20, 23 are secured to joint member 9 which is explained below. One of the intake/outlet pipes, 7, is formed in L-shape and is curved upward to directly reach joint member 9, while the other of the intake/outlet pipes, 8, is extending along the stacking direction of multi-layer structure of the tube elements and is reaching joint member 9 from a distance.

In the conventional heat exchanger apparatuses, the ends of intake/outlet pipes 7, 8 were extending to front tanks 21, 22, penetrating through rear tanks 20, 23. As a result, however, a space was created between tanks 2, 3 and intake/outlet pipes 7, 8 sandwiched by tanks 2, 3, so in cold weather, a damage due to freezing could possibly happen to this space; therefore, it is desirable to connect intake/outlet pipes 7, 8 only to the front tanks in the case the tube elements and intake/outlet pipes 7, 8 are separated, as in the case of the present invention.

For joint member 9 in the first example of the preferred embodiment, plate-type joint member 9A shown in FIG. 1–FIG. 6 is used. This plate-type joint member 9A is formed into a nearly rectangular flat plate, and first and second engaging grooves 11, 12 are made in this plate near its two edges. In the first and the second grooves 11, 12, the ends of each of refrigerant intake/outlet pipes 7, 8 are engaged and secured, respectively. In the first engaging groove 11 formed in nearly semi-circular shape, one of the intake/outlet pipes, 7, is preliminarily engaged and secured, prior to the soldering of the heat exchanger apparatus. On the other hand, in other engaging groove 12 formed in nearly oval shape, sliding passage 13 is made by creating a sufficient depth inside the second engaging groove 12, to allow intake/outlet pipe 8 to move horizontally (slide) according to the compression of the heat exchanger apparatus, and in this sliding passage 13, other intake/outlet pipe 8 is loosely inserted. Although this intake/outlet pipe 8, as mentioned later, is only loosely engaged in the second engaging groove 12 (sliding passage 13) made in plate-type joint 9 when the heat exchanger apparatus is being soldered, it will be tightly secured when the soldering of the heat exchanger apparatus has been completed.

From the tip ends of intake/outlet pipes 7, 8, flanges 14, 14 are protruded to insure their connections to plate-type joint member 9A.

As mentioned above, heat exchanger apparatus 1, assembled by integrally installing intake/outlet pipes 7, 8 on its core, and by securing plate-type joint 9 to intake/outlet pipe 7, is affixed in a furnace by means of a jig and is soldered together at high temperature. (FIG. 1 through FIG. 3, and FIG. 6)

Figure 4:
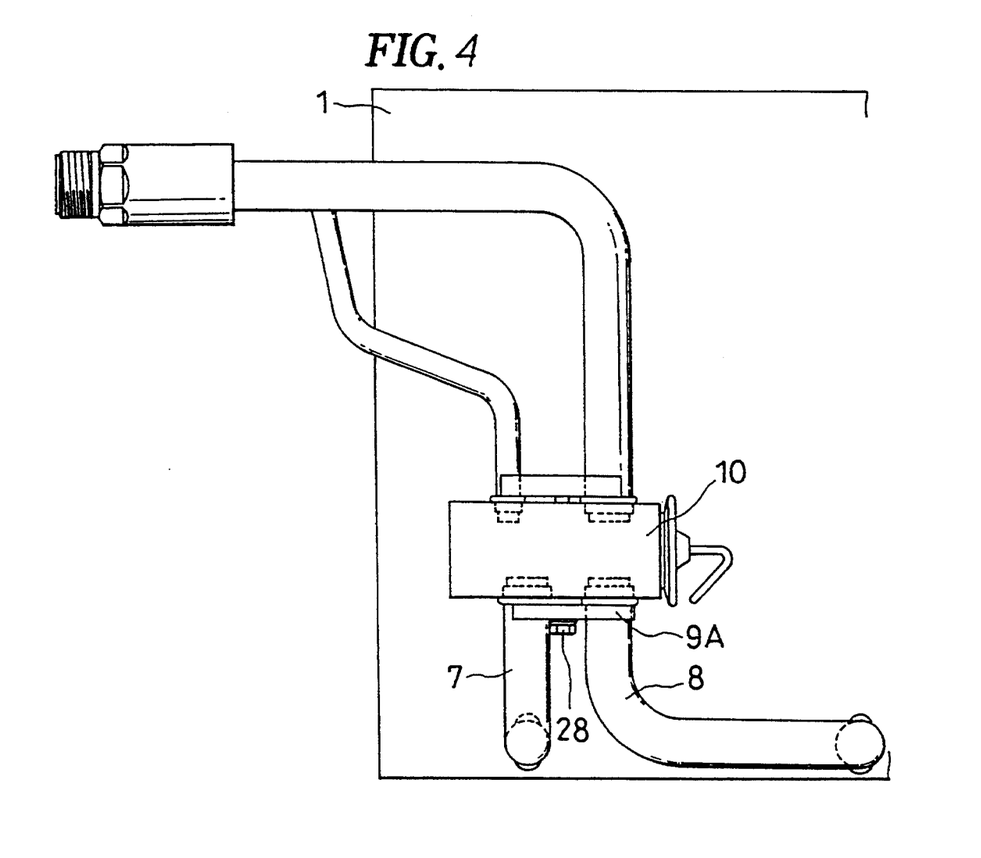
FIG. 4 shows a front view of the heat exchanger apparatus to which the expansion valve is connected.
Figure 5:
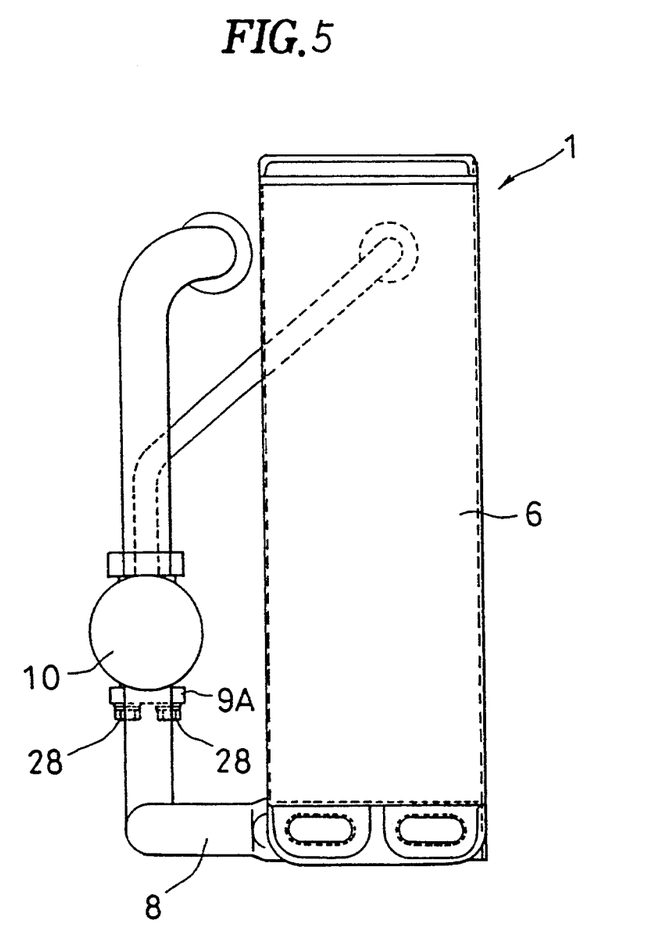
FIG. 5 shows a side view of the heat exchanger apparatus to which the expansion valve is connected.
Figure 6:
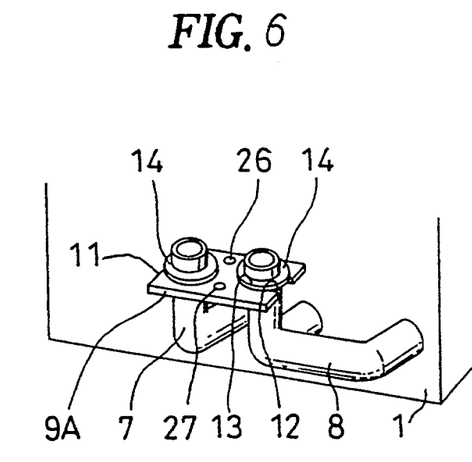
FIG. 6 shows an enlarged sidelong view of the key components of the heat exchanger apparatus.

While the heat exchanger apparatus is being soldered, the solder applied to each tube element 4 continues to melt, and as the melting progresses, the heat exchanger apparatus is compressed inward in the stacking direction of the tube elements. By this compression, one of the intake/outlet pipes, 8, integrally installed on the heat exchanger apparatus slides and moves inward in the second engaging groove 12 (with a slide passage 13) of plate-type joint 9, and the position of intake/outlet pipe 8 is determined when the compression of the heat exchanger apparatus is completed. As a result, in spite of the compression of heat exchanger apparatus 1, the movement of intake/outlet pipe 8 caused by the compression is absorbed by the second engaging groove 12 (with slide passage 13) made in plate-type joint 9A. Accordingly, intake/output pipe 8 can be secured to plate-type joint 9A, by tightening the edges of the second engaging groove 12 in which intake/outlet pipe 8 is loosely engaged, upon completion of the soldering of the heat exchanger apparatus, and the distance between intake/outlet pipes can be appropriately determined. Therefore, it becomes easy to mount expansion valve 10 on intake/outlet pipes 7, 8 secured to plate-type joint 9A with an appropriate distance between them, as shown in FIG. 4 and FIG. 5.

Two bolt-insertion holes 26, 27 are made in plate-type joint 9A, and by inserting bolts 28 into these bolt-insertion holes 26, 27, expansion valve 10 is secured by means of these bolts to plate-type joint 9A.

Figure 7:
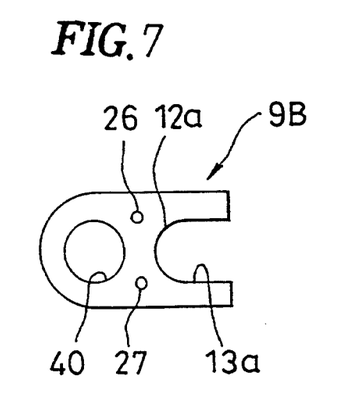
FIG. 7 shows a top view of the plate-type joint member of the heat exchanger apparatus, referred to in a second example of the preferred embodiment of the present invention.

In this example of the preferred embodiment, the first and the second engaging grooves 11, 12 are made in the plate-type joint 9A, and plate-type joint 9A is secured, by tightening, to one of the intake/outlet pipes, 7. However, as shown in FIG. 7, using plate-type joint 9B having a securing hole 40 for inserting one of intake/outlet pipes, 7, in and the engaging groove 12a (with a slide passage 13a) for inserting the other one of intake/outlet pipes, 8, in, one of intake/outlet pipes, 7, may be inserted in this securing hole 40 and be secured to plate-type joint 9B by means of a flange 14, which can be made to insure the securing.

As mentioned above, in the heat exchanger referred to in the first and the second examples of the preferred embodiment, the movement of the intake/outlet pipe caused by the compression of the core of the heat exchanger apparatus is absorbed by the slide passage in the engaging groove made in the plate-type joint; therefore, there is an advantage that the distance between both intake/outlet pipes can be appropriately determined, and the expansion valve can be mounted easily. In addition, there are other advantages that, since a plate-type joint is used, the joint does not require more than a few members, which makes the joint lighter in weight, and that the members to be soldered can be fewer since the intake/outlet pipes are secured by tightening.

The third example of the preferred embodiment is explained in reference with FIG. 8 through FIG. 13. Joint member 9 installed on the heat exchanger apparatus shown in the third example is a block-type joint 9C, and in the following passage, heat exchanger apparatus I equipped with block-type joint 9C is explained. The same numbers are supplied to identify the components which were already explained in the aforementioned examples, and the explanation for them is omitted.

In this example, the one ends of the aforementioned intake/outlet pipes 7, 8 are inserted in each group of tanks 20, 23 (at some point between tanks 20 and 23), while their other ends are connected to the connection terminals of the first and the second auxiliary pipes 51, 52, explained below, which are located on the side of an anti-expansion valve, and are integrally formed on block-type joint 9C. In this example, one of the intake/outlet pipes, 7, is made into a straight pipe, so as to directly reach block-type joint 9C, whereas the other intake/outlet pipe 8 is curved in shape so as to reach block-type joint 9C from a distance.

Figure 10:
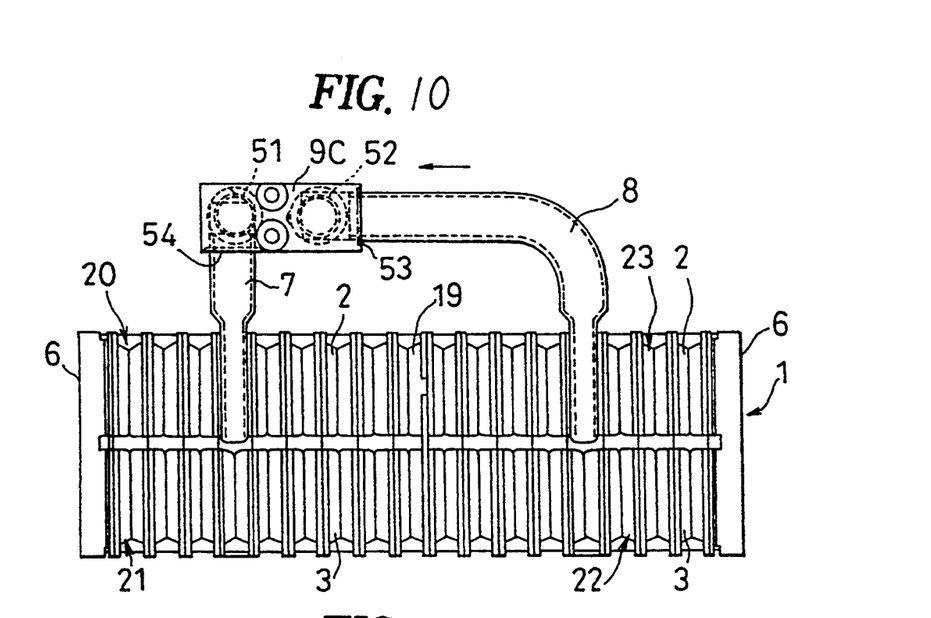
FIG. 10 shows a bottom view of the heat exchanger apparatus.

In the conventional ones, the ends of intake/outlet pipes 7, 8 were penetrating through front tanks 20, 23 and were extending to rear tanks 21, 22, but, in this case, a space was created between tanks 2, 3 and intake/outlet pipes 7, 8 sandwiched by tanks 2, 3. As a result, there was an apprehension that a damage due to freezing may be occur to the space in cold weather, so it is preferred to connect intake/outlet pipes 7, 8 only to front tanks when intake/outlet pipes 7, 8 and the tube elements are separated, as shown in FIG. 10.

The one ends of the aforementioned first and second auxiliary pipes 51, 52 are protruded from the top surface of block-type joint member 9C, to connect expansion valve 10, and their other ends are opened to face the other ends (tip ends) of intake/outlet pipes 7, 8, respectively. The aforementioned first and second auxiliary pipes 51, 52 have a larger diameter at the section where the intake/outlet pipes are connected, so that intake/outlet pipes can be inserted there.

Particularly, the tip end of the one of intake/outlet pipes, 8, is inserted in the second auxiliary pipe 52, with an appropriate room in axial direction of intake/outlet pipe 8, so that it can slide in the stacking direction of tube elements according to the compression of the heat exchanger apparatus.

In the openings of the first and of the second auxiliary pipes 51, 52, in which intake/outlet pipes 7, 8 are inserted, ring-formed washers 53, 54 clad with a solder on their surfaces are engaged, respectively. By means of these washers 53, 54, the soldering of intake/outlet pipes 7, 8 to block-type joint member 9C can be insured.

Heat exchanger apparatus 1, wherein intake/outlet pipes 7, 8 are integrally installed to the core, and block-type joint member 9C is combined with these intake/outlet pipes 7, 8, is affixed by a jig in a furnace, and is soldered into one body. (FIG. 8 through FIG. 10, and FIG. 13)

However, when the heat exchanger apparatus is being soldered, the solder applied to each tube element 4 continues to melt, and as the melting of the solder progresses, the heat exchanger apparatus is progressively compressed inward in the stacking direction of the tube elements. The one of the intake/outlet pipes, 8, which has a curved shape, and is integrally installed on the heat exchanger, slides inward into second auxiliary pipe 52 on block-type joint member 9C, as shown by the arrow in the figure, and this movement stops when the compression of the heat exchanger apparatus is completed. At this point, the position of intake/outlet pipe 8 and that of auxiliary pipe 52 are determined, and this intake/outlet pipe 8 and auxiliary pipe 52 are soldered.

Figure 11:
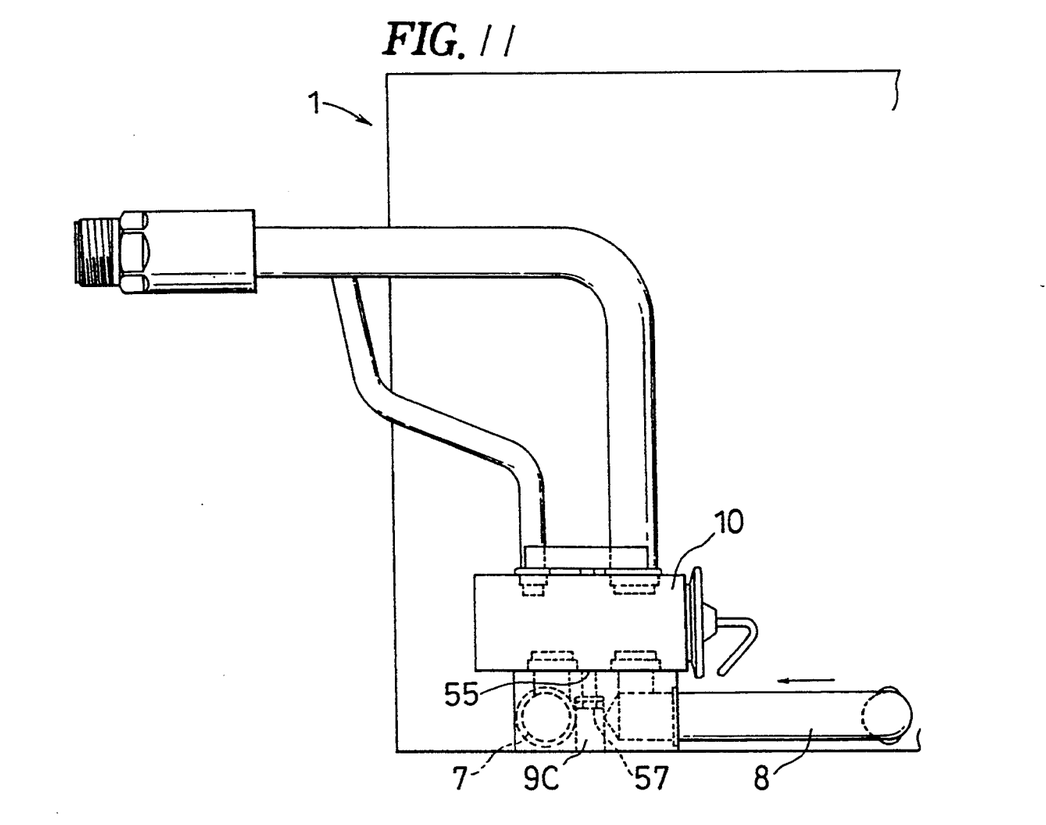
FIG. 11 shows a front view of the aforementioned heat exchanger apparatus to which the expansion valve is connected.
Figure 12:
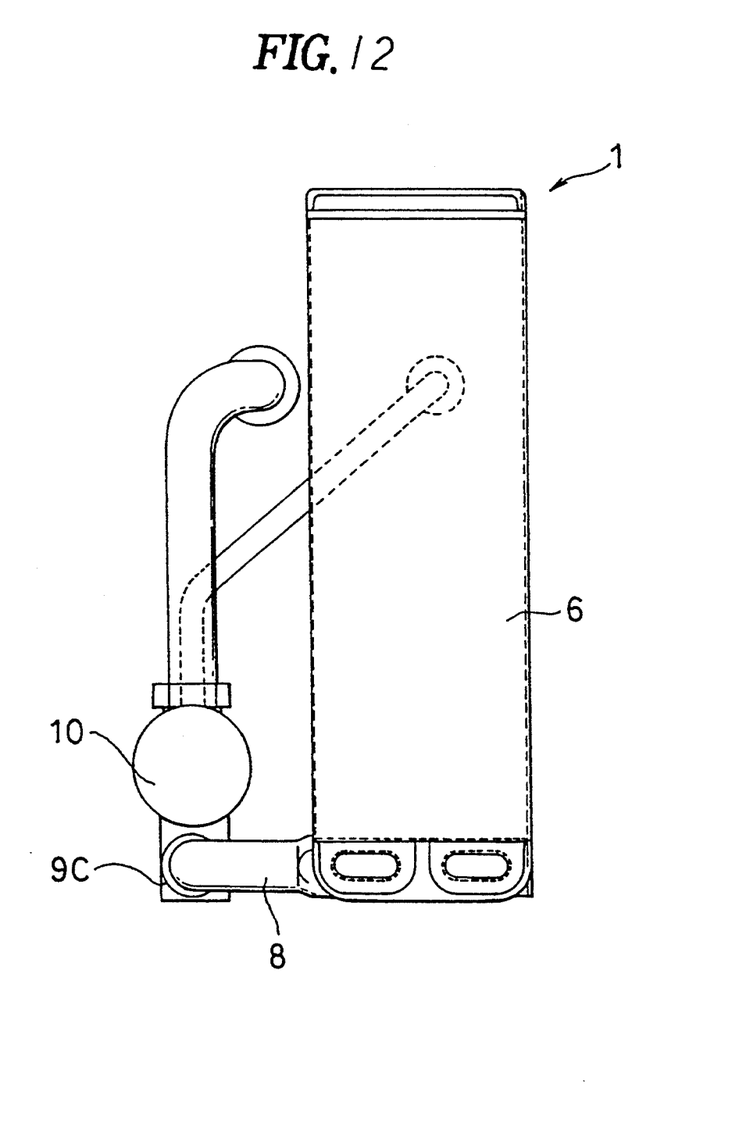
FIG. 12 shows a side view of the aforementioned heat exchanger apparatus to which the expansion valve is connected.
Figure 13:
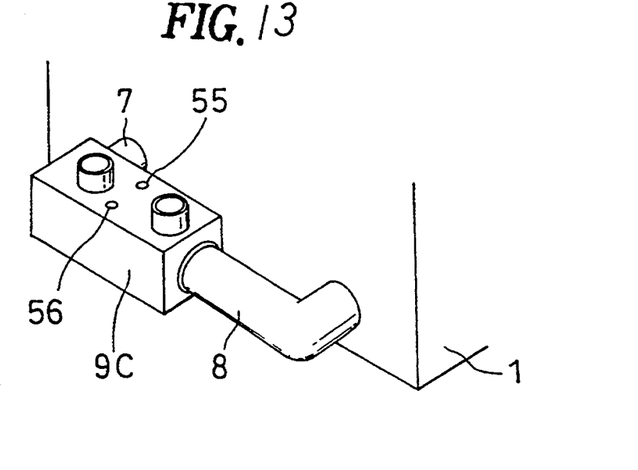
FIG. 13 shows a sidelong view of the key components of the aforementioned heat exchanger apparatus.

As a result of the aforementioned process, heat exchanger apparatus 1 is compressed, but the movement of the intake/outlet pipe 8 caused by the compression is absorbed inside block-type joint member 9C; therefore, the distance between the first and the second auxiliary pipes 51, 52 has only to be considered in connecting the expansion valve. In other words, the compression of the core of the heat exchanger apparatus is absorbed, as a result of an adjustment of the joining seam width, where intake/outlet pipe 8 sliding in the compressing direction and auxiliary pipe 52 are joined, and the compression does not affect the distance between auxiliary pipes 51, 52 on block-type joint member 9C, so the mounting of the expansion valve 10 to block-type joint member 9C can be performed easily, as shown in FIG. 11 and FIG. 12.

On block-type joint member 9C, two bolt-insertion holes 55, 56 are made, and the bolts are inserted in these bolt-insertion holes 55, 56, so that expansion valve 10 is secured, by the bolts, to block-type joint member 9C.

Figure 14:
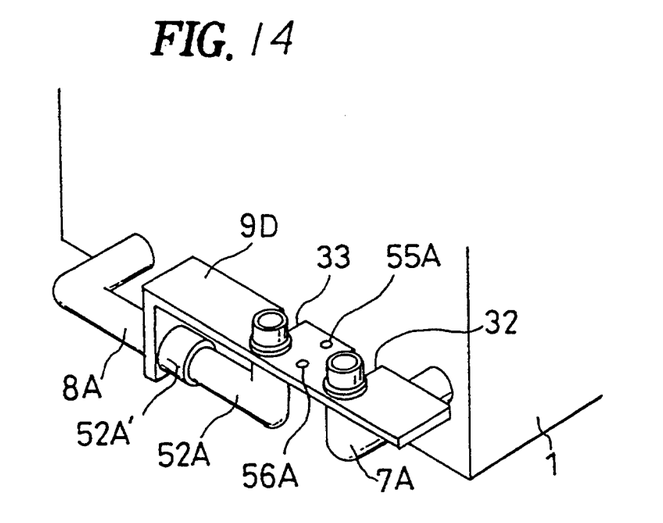
FIG. 14 shows a sidelong view of the key components of the heat exchanger apparatus, referred to in a fourth example of the preferred embodiment of the present invention.
Figure 15:
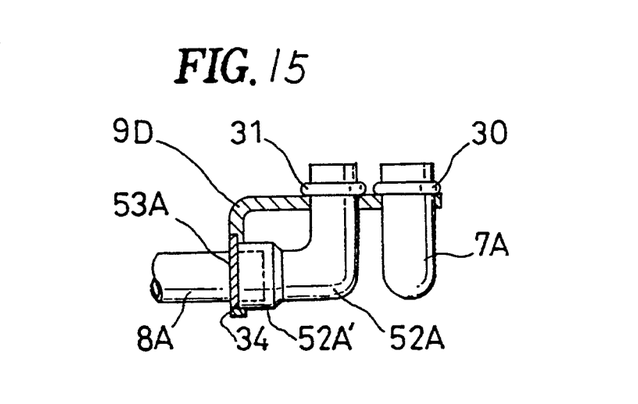
FIG. 15 shows an enlarged view of the partial key components of the heat exchanger apparatus of the present invention.

A fourth example of the preferred embodiment is explained below in reference with FIG. 14 and FIG. 15. The core of the heat exchanger apparatus 1, being the same as that mentioned above, is omitted from the explanation. The same components as those in the third example are identified by attaching an A to the same number.

The fourth example is different from the third example in that plate-type joint member bent by a press is used in place of block-type joint member 9C connecting expansion valve 10.

Plate-type joint member is bent in nearly L-shape. In the top surface of this plate-type joint member, grooves 32, 33 are made, in which the tip end of auxiliary pipe 52A in pipe form connected with intake/outlet pipe 8A, and the tip end of other intake/outlet pipe 7A are inserted, and they are secured, by tightening, to this plate-type joint member. In the back surface of plate-type joint member, an opening 34, to insert intake/outlet pipe 8, in, is made, and in this opening 34, washer 53A clad with the solder for soldering intake/outlet pipe 8A is engaged. On the tip ends of this auxiliary pipe 52 and of intake/outlet pipe 7A, flanges 30, 31 are mounted, to insure the securing of these pipes to plate-type joint member .

As to intake/outlet pipe 8A bent inward in the stacking direction of the tube elements of the heat exchanger, its tip end is inserted in auxiliary pipe 10A, with some room along the axial direction, so that the pipe 8A can slide in the expanded section 52A' made at the other end of auxiliary pipe 52A.

Heat exchanger apparatus 1, having the aforementioned construction, is assembled, by inserting auxiliary pipe 52A and intake pipe 7A in grooves 32, 33 of plate-type joint member , respectively, by securing them, by tightening, to plate-type joint member , and simultaneously by inserting the tip end of intake/outlet pipe 8A in expanded section 52A' of auxiliary pipe 52A. Then, they are integrated into one body when soldered in a furnace at high temperature.

In the heat exchanger apparatus equipped with plate-type joint member 9D referred in the fourth example, as in the case of the heat exchanger apparatus referred in the aforementioned examples, the solder applied to each tube element 4 progressively melts, while the heat exchanger apparatus is being soldered, so the heat exchanger apparatus is progressively compressed inward in the stacking direction of the tube elements, as the melting of the solder progresses. Intake/outlet pipe 8A in curved shape integrally installed on the heat exchanger apparatus gradually slides inward into auxiliary pipe 52A, according to the compression. This movement is stopped when the compression of the heat exchanger apparatus is completed. At this point, the position of intake/outlet pipe 8A and that of auxiliary pipe 52A are determined, and intake/outlet pipe 8A and auxiliary pipe 52A are soldered.

As a result, in spite of the compression of the heat exchanger apparatus, the movement of the intake/outlet pipe 8A caused by the compression is absorbed by intake/outlet pipe 8A and auxiliary pipe 52A, and therefore the same advantages can be obtained as those in the above examples.

In this fourth example of the preferred embodiment, since plate-type joint member bent by a press is used in place of block-type joint member 9C, the heat exchanger apparatus in the fourth example has an additional advantage of being lighter in weight than that in the third example. In the aforementioned examples, the joint member is formed in block shape or in plate shape, but the shape of the joint member can take any shape as long as it can securely hold the auxiliary pipe that absorbs the movement of the intake/outlet pipe's tip end in axial direction.

As explained above, the present invention offers an advantage that the expansion valve can be easily mounted, since the movement of the intake/outlet pipe due to the compression of the core of the heat exchanger apparatus is absorbed by the intake/outlet pipe and the auxiliary pipe connected with the intake/outlet pipe, as shown in the third and fourth examples.

What is claimed is:

1. A heat exchanger apparatus having a core of multilayer structure of alternately stacked tube element and fin members, and being equipped with a joint member for mounting an expansion valve on refrigerant intake/outlet pipes integrally installed on said core, wherein said joint member comprises:
   a first securing means for securing one of said intake/outlet pipes;
   a second securing means for securing the other one of said intake/outlet pipes, and for simultaneously absorbing the displacement of said tube elements in the stacking direction.

2. A heat exchanger apparatus as recited in claim 1, wherein said joint member has a plate shape; said first securing means is a first securing groove for securing one of said intake/outlet pipes made in one edge of the joint member; said second securing means is a second securing groove made in said plate at the other edge, and having a sliding passage in the stacking direction.

3. A heat exchanger apparatus as recited in claim 2, wherein said second securing means absorbs, by means of its passage, the compression caused by soldering of the tube elements, and subsequently secures the other one of the intake/outlet pipes by tightening the edges of the second securing groove.

4. A heat exchanger apparatus as recited in claim 1, wherein said joint member has a plate shape; said first securing means is a securing hole in arc shape, made in one edge of the joint member for securing one of said intake/outlet pipes; said second securing means made in said joint member at its other edge is a securing groove having a slide passage in the stacking direction.

5. A heat exchanger apparatus as recited in claim 4, wherein said second securing means absorbs, by means of its sliding passage, the compression caused by soldering of the tube elements, and subsequently secures the other one of the intake/outlet pipes by tightening the edges of the second securing groove.

6. A heat exchanger apparatus as recited in claim 1, wherein said joint member is a block-shaped joint member on which a first auxiliary pipe and a second auxiliary pipe are formed; said first securing means is the first auxiliary pipe for securing one of said intake/outlet pipes; said second securing means is formed so as to have a specific length in the stacking direction of said tube elements; and the other one of said intake/outlet pipes is the second auxiliary pipe inserted in the stacking direction of said tube elements.

7. A heat exchanger apparatus as recited in claim 6, wherein said second securing means, by its second auxiliary pipe, absorbs the compression caused by soldering of said tube elements before it is soldered.

8. A heat exchanger apparatus as recited in claim 1, wherein said joint member is a plate-type joint member bent in L-shape, in which first and second grooves are made; said first securing means is the first groove in which one of said intake/outlet pipes formed on said joint member is inserted; said second securing means has, at its one end, an expanded section in which the tip end of said other one of the intake/outlet pipes is inserted in the stacking direction of said tube elements, and has, at its other end, an auxiliary pipe inserted in the second groove.

9. A heat exchanger apparatus recited in claim 8, wherein said second securing means is soldered after it has absorbed, with its second auxiliary pipe, the compression caused by soldering of the tube elements.

* * * * *